(12) United States Patent
Gier

(10) Patent No.: US 10,065,460 B2
(45) Date of Patent: Sep. 4, 2018

(54) METHOD FOR MONITORING AN AIR PRESSURE IN AT LEAST ONE TYRE OF A MOTOR VEHICLE

(71) Applicant: VOLKSWAGEN AKTIENGESELLSCHAFT, Wolfsburg (DE)

(72) Inventor: Klaus-Jürgen Gier, Lehre (DE)

(73) Assignee: Volkswagen AG (DE)

( * ) Notice: Subject to any disclaimer, the term of this patent is extended or adjusted under 35 U.S.C. 154(b) by 194 days.

(21) Appl. No.: 14/898,121

(22) PCT Filed: Feb. 27, 2014

(86) PCT No.: PCT/EP2014/053829
§ 371 (c)(1),
(2) Date: Dec. 12, 2015

(87) PCT Pub. No.: WO2015/000607
PCT Pub. Date: Jan. 8, 2015

(65) Prior Publication Data
US 2016/0207364 A1 Jul. 21, 2016

(30) Foreign Application Priority Data
Jul. 1, 2013 (DE) ........................ 10 2013 212 799

(51) Int. Cl.
*G06F 7/00* (2006.01)
*B60C 23/04* (2006.01)

(52) U.S. Cl.
CPC ...... *B60C 23/0484* (2013.01); *B60C 23/0403* (2013.01); *B60C 23/0405* (2013.01); *B60C 23/0406* (2013.01)

(58) Field of Classification Search
CPC ............ B60C 23/0406; B60C 23/0405; B60C 23/0403; B60C 23/0484
See application file for complete search history.

(56) References Cited

U.S. PATENT DOCUMENTS

| 6,445,287 B1 * | 9/2002 | Schofield ............ B60C 23/0401 340/442 |
| 2003/0058090 A1 * | 3/2003 | Schofield ................ B60C 23/00 340/442 |

(Continued)

FOREIGN PATENT DOCUMENTS

| DE | 102004022930 A1 | 12/2004 |
| DE | 102008003845 A1 | 7/2009 |

(Continued)

OTHER PUBLICATIONS

Search Report for German Patent Application No. 10 2013 212 799.5; dated Aug. 28, 2013.

(Continued)

*Primary Examiner* — Hussein Elchanti
(74) *Attorney, Agent, or Firm* — Barnes & Thornburg LLP

(57) ABSTRACT

A method for monitoring an air pressure in at least one tire of a motor vehicle, wherein at least one air pressure in the tire is detected by at least one measuring electronics unit present in the tire and data is transmitted by the measuring electronics unit to a control unit. Depending on the data, the control unit activates components of the motor vehicle to generate optical and/or acoustic signals. The control unit is switched into an after-running mode for a defined period of time when an ignition of the motor vehicle is shut off, in which mode the control unit can continue to receive data from the measuring electronics unit and may activate components of the motor vehicle to generate optical and/or acoustic signals.

21 Claims, 2 Drawing Sheets

(56) References Cited

U.S. PATENT DOCUMENTS

| | | | | |
|---|---|---|---|---|
| 2006/0220813 A1* | 10/2006 | Utter | ................... | B60C 23/0408 |
| | | | | 340/442 |
| 2009/0112389 A1* | 4/2009 | Yamamoto | .......... | B60C 23/0401 |
| | | | | 701/31.4 |
| 2011/0205047 A1 | 8/2011 | Patel et al. | | |
| 2015/0014082 A1* | 1/2015 | Kasper | ..................... | B60T 7/12 |
| | | | | 180/282 |

FOREIGN PATENT DOCUMENTS

| | | |
|---|---|---|
| DE | 102009058881 A1 | 6/2011 |
| WO | 2011004229 A1 | 1/2011 |
| WO | 2011073072 A1 | 6/2011 |

OTHER PUBLICATIONS

Search Report for International Patent Application No. PCT/EP2014/053829; dated May 20, 2014.

\* cited by examiner

METHOD FOR MONITORING AN AIR PRESSURE IN AT LEAST ONE TYRE OF A MOTOR VEHICLE

PRIORITY CLAIM

This patent application is a U.S. National Phase of International Patent Application No. PCT/EP2014/053829, filed 27 Feb. 2014, which claims priority to German Patent Application No. 10 2013 212 799.5, filed 1 Jul. 2013, the disclosures of which are incorporated herein by reference in their entirety.

FIELD

Illustrative embodiments relate to a method for monitoring an air pressure in at least one tire of a motor vehicle

BRIEF DESCRIPTION OF THE FIGURES

In the drawings, in each case in schematic form.

DETAILED DESCRIPTION OF THE DISCLOSED EMBODIMENTS

Figure 1:
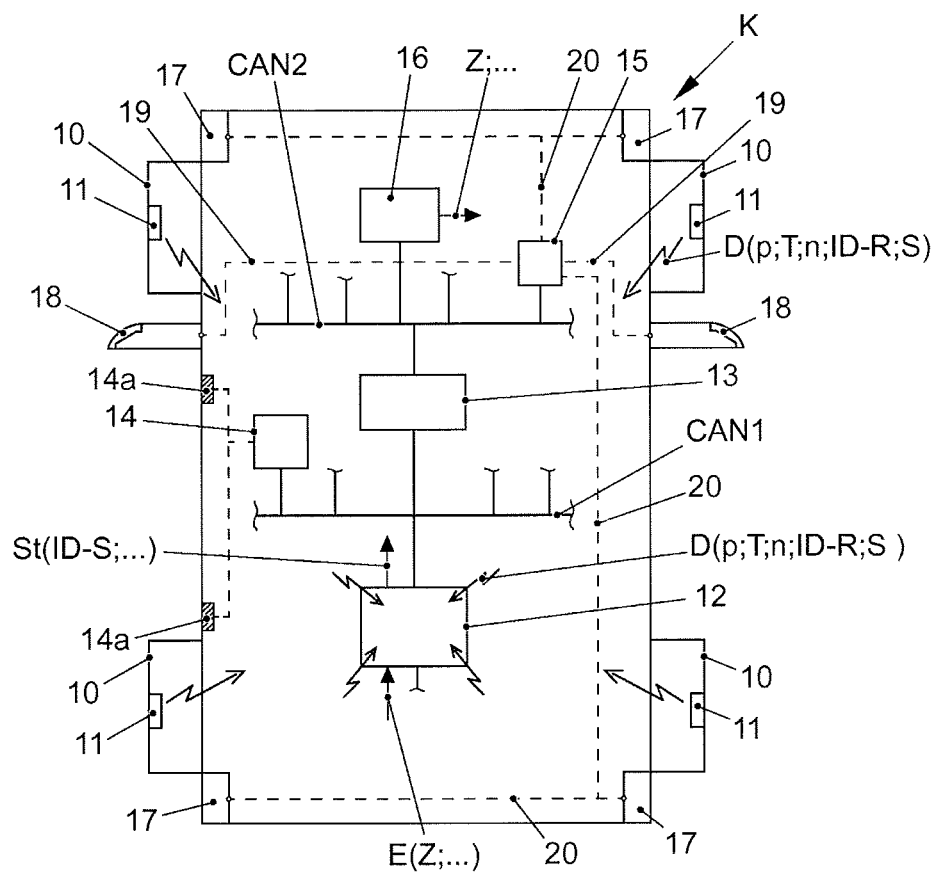
FIG. 1 shows a motor vehicle which is designed to carry out the disclosed method.
Figure 2:
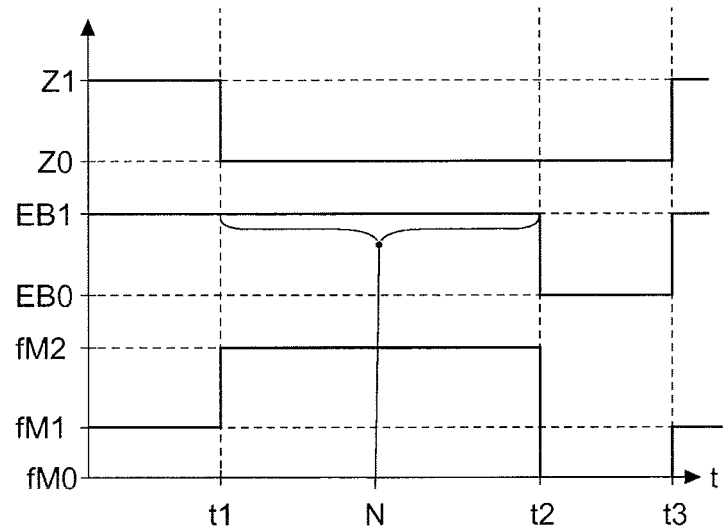
FIG. 2 shows a diagram representing the ready-to-receive state of the tire pressure control device and a measuring frequency of the wheel measuring electronics unit as a function of the ignition status.

Disclosed embodiments provide a method for monitoring an air pressure in at least one tire of a motor vehicle, wherein at least one air pressure in the tire is measured by means of at least one measuring electronics unit present in the tire, and data is transmitted by the measuring electronics unit to a control unit, wherein the control unit actuates components of the motor vehicle as a function of the data, to generate optical signals and/or acoustic signals.

As a result, a significant precondition for the air pressure in the tires of a motor vehicle to be able to be monitored (at least for a specific time period) and set even when the ignition key is pulled out is met.

During a tire pressure check and an active change in tire pressure which are carried out by a vehicle driver, the vehicle driver can therefore pull out the vehicle key and deal with his work tasks without worry. Moreover, the consumers which were most recently still switched on are prevented from loading the battery further.

The disclosed method is developed in such a way that when a limiting value of a pressure change detected in the tire in a specific time period is reached or exceeded, the measuring electronics unit implements a change in the operating mode and transmits data with a transmission frequency which is increased compared to a normal state and/or a transmission interval which is shortened compared to a normal state to the control unit and in doing so causes the control unit to go into an assistance mode which assists an active change in tire pressure, and for this purpose to actuate, by means of a vehicle-specific bus system, the components which serve to generate optical signals and/or acoustic signals.

If the control unit is, therefore, in the run-on mode, the changeover of the operating mode of the measuring electronics unit (increased transmission frequency) is used as a trigger for transferring the control unit into an assistance mode in the first place. An assistance mode is understood to be that operating mode of the control unit which serves for optically and/or acoustically supporting a vehicle driver who corrects the tire pressure. For this purpose, visible and/or audible signals in particular are generated from outside the motor vehicle.

In this context it is very expedient if at least one travel direction indicator is actuated by the control unit in the assistance mode to signal activation of the assistance mode the at least one travel direction indicator is firstly actuated to flash at a specific frequency, and when the pressure changes the flashing frequency is changed in one direction (for example increased)—starting from a specific frequency—as a setpoint pressure is increasingly approached, and is changed in another direction (for example decreased) as the distance from the setpoint pressure increases, wherein when the setpoint pressure is reached the at least one travel direction indicator is actuated as a continuous light for a specific time period. A converse change in frequency, i.e. decrease in the flashing frequency when the setpoint pressure is approached and increasing of the flashing frequency with distance from the setpoint pressure is also conceivable.

As a result of this embodiment of the method, the vehicle driver who corrects the tire pressure can be provided with a communication which can be followed particularly easily, indicating whether the tire pressure is moving in the correct direction or is at the correct setting or not during the correction of the tire pressure.

In this context, the assistance mode the control unit actuates exclusively travel direction indicators which are located in the rear-view mirrors. These can be seen particularly well. Furthermore, this avoids a situation in which when the tire pressure is corrected the vehicle driver confuses other road users who, in particular in the dark, suppose that flashing of the flashing warning light system implies a breakdown or even an accident.

A further development of the inventive concept provides that when a permissible pressure range is exceeded or undershot, the at least one travel direction indicator is actuated to flash at a specific frequency which is higher than the highest frequency before the setpoint pressure is reached.

In this way, the generation of easily understandable warning signals can be optimized.

According to general life experience, the vehicle driver will correct the tire inflation pressure not only at one tire but generally at a plurality of tires. To permit sufficient time for correction of the remaining tires after correction of the tire pressure of one tire, according to a further disclosed embodiment the run-on mode is extended in each case by a specific time period as soon as the control unit has gone into the assistance mode once.

It also appears expedient if when the motor vehicle is in the stationary state, that is to say if the measuring electronics unit no longer measures any rotation of the wheels, the measuring electronics unit, and at the latest when the ignition of the motor vehicle is shut off, is placed for a specific time period in an operating mode in which its measuring frequency is increased compared to a normal state. In this way, changes in tire pressure which are, under certain circumstances, being carried out actively can be sensed more precisely.

To induce in an optimum way a vehicle driver to correct the tire pressure it is possible that when the setpoint pressure is reached, an on-board buzzer or at least one electric window lifter or a door closing system or at least one windshield wiper or one rear-view mirror adjustment system or a voice output system is additionally activated, for example via the Infotainment system.

In this way, additional acoustic and also optical signals can be generated using on-board means which are present in any case.

It also appears important to mention that it can be very expedient if the generated optical and/or acoustic signals are of an exclusively purely qualitative nature, that is to say no absolute pressure values are displayed or output. Instead, it makes sense to stay with pure qualitative information or signals such as, for example, "tire pressure too low!", "tire pressure too high!", "tire pressure set correctly!" etc. or with a setting of a corresponding flashing frequency of at least one travel direction indicator.

In this way even a temperature-compensated setting of the tire pressure is possible without the risk of confusing a person who corrects the tire pressure.

This is because the tire pressure is also known to change with a change in operating temperature of the tire. When customary pressure manometers, which are usually very inaccurate compared to the vehicle's own measuring electronics unit and also do not permit any temperature compensation, are used at gas stations a person who is changing the tire pressure can easily become confused with respect to a vehicle-side display of absolute values owing to differences between the two displays.

In the case of the disclosed embodiments, the vehicle driver does not need to be concerned with this. Ultimately, all that counts for him is the transfer of the vehicle-side signal which confirms that the correct setpoint pressure (if appropriate taking into account a current operating temperature) is reached.

In this respect, the vehicle driver is independent of inaccurate manometers and can entirely dispense with them.

However, disclosed embodiments also relate to a motor vehicle for carrying out the disclosed method. The motor vehicle is to be embodied in such a way that it has at least one measuring electronics unit, present in at least one tire, for measuring at least one air pressure in the tire and for transmitting data of the measuring electronics unit to a control unit, wherein components of the motor vehicle can be actuated by the control unit as a function of the data to generate optical signals and/or acoustic signals, and when an ignition of the motor vehicle is shut off, the control unit can be switched into a run-on mode for a specific time period in which the control unit can continue to receive data from the measuring electronics unit and can actuate components of the motor vehicle as a function of the data to generate optical signals and/or acoustic signals.

A motor vehicle is, therefore, made available in which the driver can carry out an active change in the tire pressure while saving battery resources and avoiding an increased risk of theft.

It is also to be expressly pointed out that the vehicle radio key for a method for monitoring a tire pressure in at least one tire can also be used. The radio key is then to be configured in a diagnostics-enabled fashion, that is to say the necessary diagnostics data (current setpoint pressures) are stored in it.

A very elegant method for monitoring an air pressure in at least one tire can then function as follows:

Given a relevant change in inflation pressure or when a specific pressure threshold is undershot, the measuring electronics unit additionally transmits a specific code which is received and evaluated by a control unit which is assigned to the vehicle radio key. In such a case, the control unit which is assigned to the vehicle radio key "wakes up" the control unit which communicates with the tire measuring electronics unit via the bus and places it in a ready-to-receive state for a specific time.

In such a method, the placing of the control unit in a ready-to-receive state is therefore not dependent on the status of the ignition but rather only on the measured pressure state of the tires. The control unit can go at any time into an assistance mode which assists an active change in tire pressure, and can do this not only in the time window of a specific run-on mode after the shutting down of the ignition. The control unit which communicates with the tire measuring electronics unit therefore does not come into conflict with existing quiescent current requirements. Instead, the specific capabilities of the control unit which communicates with the vehicle radio key are used to be able to receive data over relatively long time periods with the minimum possible energy consumption.

In a way which is analogous with the flashing of the travel direction indicators which has already been described, lighting means which are arranged in the vehicle radio key can be actuated as a function of the respective tire inflation pressure to flash at a variable frequency.

When using a vehicle radio key the method is less sensitive to "dead spots" in terms of radio reception and therefore even more interference-free radio transmission of the data becomes possible. Furthermore, a vehicle radio key (in contrast to other conceivable separate displays such as, for example a smart phone) is understandably not forgotten when the vehicle is operating.

Finally, it is also conceivable to use a vehicle-specific tire inflation pressure compressor. Such a compressor which is generally kept separate can be connected to the vehicle's on-board power system and actuated by means of the control unit which is responsible for the tire inflation pressure. It is then conceivable for the compressor to be activated as soon as the actual pressure is lower than the setpoint pressure, and for the compressor to start a venting function as soon as the actual pressure is higher than the setpoint pressure. As a result, a tire inflation pressure correction which is completely autonomous of an operator is made possible.

Exemplary embodiments are illustrated in the drawings and will be explained in more detail in the following description. In this context, identical reference symbols relate to identical, comparable or functionally identical components, wherein corresponding or comparable properties are achieved even if a repeated description is omitted.

Firstly, reference is made to FIG. 1. In this figure, a motor vehicle K is illustrated which has four tires 10 which are equipped with a measuring electronics unit 11.

The measuring electronics unit 11 is autonomous with respect to the supply voltage from a vehicle on-board power system voltage of the motor vehicle K and is designed to measure a tire pressure P in the tire 10, a tire temperature T and a wheel speed N.

The measuring electronics unit 11 also has a transmitter (not illustrated in more detail) by means of which data packets D can be transferred in a wireless fashion to a tire pressure-monitoring control device (TPM control device)

12. For this purpose, the TPM control device 12 itself has a receiver (not illustrated in more detail).

The TPM control device 12 is a component of a vehicle on-board power system which is composed of a plurality of CAN buses via which various control devices are networked to one another.

For example two CAN buses CAN1 and CAN2 are indicated which are connected to one another via a gateway 13.

Further subnetworks (LIN buses) which are present are not illustrated.

From the figure it is also clear that a control device 14 for window lifters 14a and the TPM control device 12 are connected to the CAN bus CAN1.

For the sake of clarity, only the window lifters 14a on the left-hand side are illustrated.

Inter alia, a vehicle on-board power system control device 16 and a control device 15 for actuating travel direction indicators 17 which are arranged in the headlights and lights and for actuating travel direction indicators 18 which are arranged in exterior rear-view mirrors are connected to the CAN bus CAN2.

In this context, control lines 19 serve to actuate the travel direction indicators 18 and control lines 20 serve to actuate the travel direction indicators 17.

When the ignition of the motor vehicle K is switched on and in the driving mode data packets D are continuously transmitted by radio (cf. lightning symbols) to the TPM control device 12 via the measuring electronics unit 11 of the tires 10. Each data packet is composed of at least information about the variables p (tire pressure), T (tire temperature), n (wheel speed), ID-R (tire identifier) and S (transmission mode of the measuring electronics unit).

The transmitted data packets D are then evaluated by an evaluation unit (not illustrated in more detail) which is located in the TPM control device 12 and, if appropriate, corresponding warning messages are output to a vehicle driver on a suitable display (for example in a combination instrument) as a function of a stored software application.

In the messages, the vehicle driver can be requested, for example, to look for the closest gas station and perform a corresponding tire pressure correction.

In this figure, an ignition status Z is plotted against the time t.

As a function thereof, a ready-to-receive state EB of the TPM control device 12 and a measuring frequency of the measuring electronics unit 11 vary, that is to say the measurement of the variables tire pressure p, tire temperature T and wheel speed n carried out per unit of time.

If the vehicle driver stops the motor vehicle K at a suitable gas station to actively change or correct the tire pressure, he pulls the ignition key out of the ignition lock, with the result that the ignition status Z changes from Z1 (ignition on) to the ignition status Z0 (ignition off). This occurs at a time t1.

However, at the same time the TPM control device 12 maintains its ready-to-receive state (also EB1) for a specific time period (t2–t1). This state in which the TPM control device 12 continues to be able to receive data packets D from the measuring electronics units 11 is to be referred to as the run-on mode N.

Likewise at the time t1, the measuring frequency of the measuring electronics units 11 is increased from a measuring frequency fm1 to a measuring frequency fm2. The duration of the increased measuring frequency fm2 may be synchronized with the time period of the run-on mode N.

If no active change in tire pressure is carried out by the driver during the run-on mode N, after the end of the run-on mode N (time t2) the ready-to-receive state of the TPM control device 12 is set to EB0 (no ready-to-receive state). The measuring frequency fm is also reset to fm=fm0 (0 Hz, no measurement).

The ready-to-receive state EB of the TPM control device 12 (EB=EB1) and a measurement in the measuring electronics units 11 (fm=fm1) is only reactivated by resetting the ignition (Z=Z1) at a later time t3.

However, if the vehicle driver changes the tire pressure (letting air out or inflating) at one of the tires 10 within the run-on mode N, such a change in pressure is detected by the measuring electronics unit 11.

Figure 4:
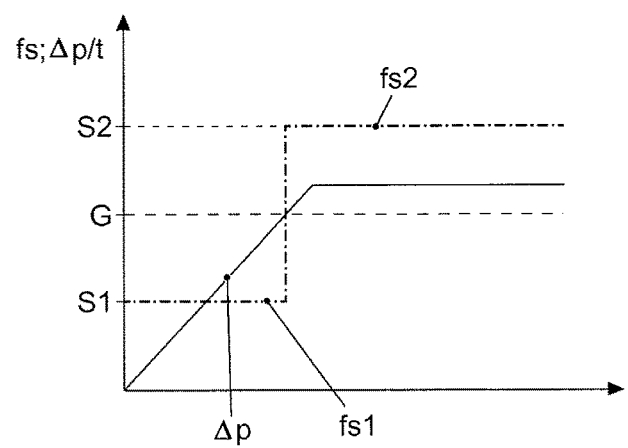
FIG. 4 shows the dependence of the transmission frequency of a wheel measuring electronics unit on a change in tire pressure which is measured per unit of time.

If a change in pressure Δp per time unit t exceeds a specific limiting value G, the measuring electronics unit 11 changes from a transmission mode S1 with a first transmission frequency fS1 to a transmission mode S2 with a higher transmission frequency fS2 (cf. FIG. 4).

Data packets D are transmitted with the transmission frequency fS2 from the measuring electronics unit 11 to the TPM control device 12 (cf. FIG. 1).

The TPM control device 12 then goes into an "inflation assistance" mode (assistance mode) if the following criteria are met:
- the function "inflation assistance" is activated by the vehicle driver via the man/machine interface (MMS, for example a setting menu of the vehicle on-board computer),
- the rotational speed n which is transferred in the data packet D is equal to 0 (vehicle in the stationary state),
- the information unit (data bit) which is transferred in the data packet D for the transmission mode S is set to S1 (high-speed transmission mode), and
- the TPM control device 12 is in the run-on mode N.

If the specified preconditions are satisfied, the TPM control device 12 is set to the "inflation assistance" operating mode. In this mode, the TPM control device 12 "wakes up" the CAN bus CAN1 and therefore has access to the control device 14 and also access to the control device 15 via the CAN bus CAN2 connected to the gateway 13.

It is assumed that the measuring electronics unit 11 of the tires 10 in the TPM control device 12 is already trained and correctly assigned. In addition it is assumed that the vehicle driver has input correct values for the tire types and setpoint pressures used via the man/machine interface.

It is to be noted that the ignition status Z is made available, as a component of an output signal of the vehicle on-board power system control device 16 to the TPM control device 12, at least as a component of an input signal D.

It is also to be noted that despite an ignition key having been pulled out, the TPM control device 12 and the components which are to be actuated can, when necessary, be placed in an active state on the basis of a direct connection to the vehicle on-board power system voltage (via what is referred to as terminal 30).

In the exemplary embodiment, the TPM control device 12 now outputs, via the bus system (CAN1, 13, CAN2), control signals St which contain, inter alia, a control device identifier ID-S, and therefore permit selective addressing and waking up of the control devices 14 and/or 15.

In the present case, the control device 15 is actuated in such a way that during the active change in the tire pressure, a vehicle driver only actuates the exterior rear-view mirror travel direction indicators 18 to generate a specific flashing frequency and therefore to assist the vehicle driver visually.

Figure 3:
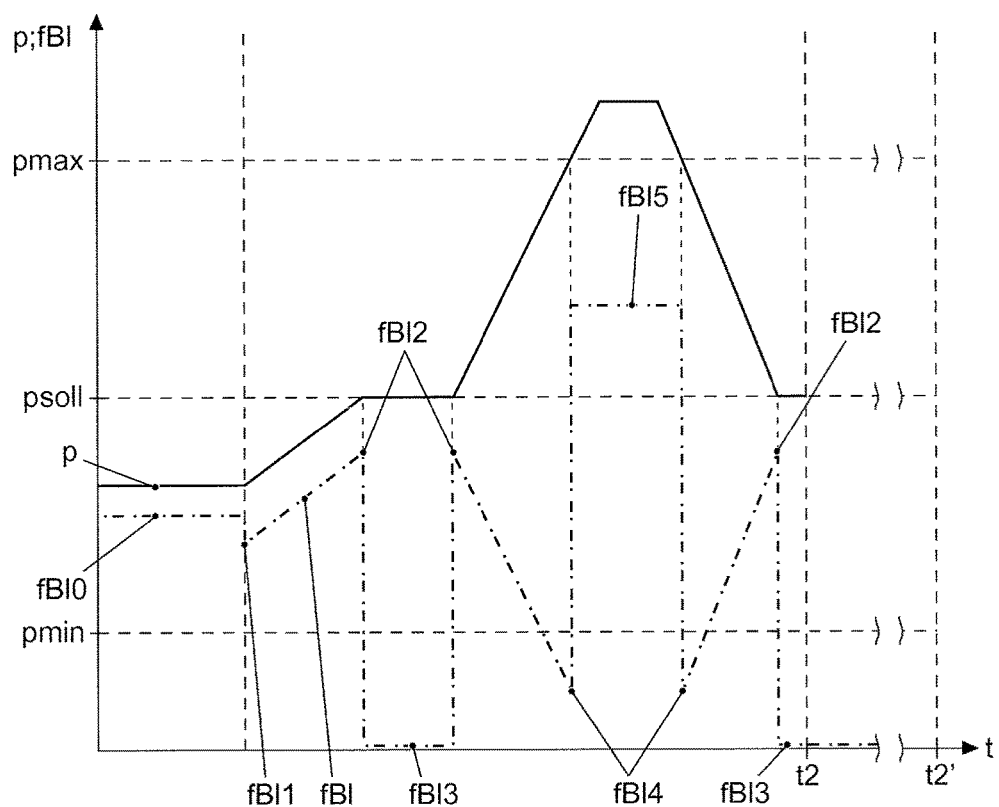
FIG. 3 shows the dependence of the flashing frequency of a travel direction indicator, actuated by the tire pressure control device, as a function of the set tire pressure.

This will be explained in more detail with reference to FIG. 3:

To signal the system readiness, the travel direction indicators 18 initially start to flash with a "medium" frequency fbI=fbI0. Subsequently, the flashing frequency fbI jumps to a point fbI1, which behaves approximately proportionally to the proximity of the present tire pressure p to a setpoint tire pressure psoll. A significant distance of the tire pressure p from a setpoint pressure psoll results in a low initial flashing frequency fbI1, and a short distance from the setpoint pressure psoll results in a high initial flashing frequency fbI1.

In the exemplary embodiment, the initial flashing frequency fIb1 is somewhat below the flashing frequency fbI0. Starting from the flashing frequency fbI1, the tire pressure p is increased in the direction of the tire setpoint pressure psoll as a result of which the flashing frequency fbI also changes synchronously in the direction of a relatively high flashing frequency fbI2.

When the tire setpoint pressure psoll is reached, the flashing frequency fbI drops suddenly to a flashing frequency fbI3 with 0 Hertz (continuous light).

However, if the tire pressure p is increased further starting from the setpoint pressure psoll, the flashing frequency fbI increases suddenly again to the flashing frequency fbI2, and as the increase in the tire pressure p continues (that is to say as the distance from the setpoint pressure psoll increases), it drops to a relatively low flashing frequency fbI4.

As soon as the tire pressure p is increased above a maximum permissible tire pressure pmax, the flashing frequency fbI jumps suddenly to a flashing frequency fbI5 which is higher than the highest frequency fbI2 before the setpoint pressure psoll is reached.

Having been alerted by such high-frequency flashing, the vehicle driver will attempt to correct the tire pressure p downward again by letting out air. When the maximum permissible tire pressure pmax is reached again, the flashing frequency fbI will drop again to a comparatively low value fbI4 and subsequently rise continuously again to the flashing frequency fbI2 when the tire pressure p approaches the tire setpoint pressure psoll, and the flashing frequency fbI will finally drop back again to the value fbI3 when the setpoint pressure psoll is reached.

When the tire setpoint pressure psoll is reached, the travel direction indicators 18 therefore output a continuous light. The continuous light may go out after a time period of a few seconds.

However, the reaching of the setpoint tire pressure psoll can also be signaled by further acoustic and/or optical signals. It is conceivable here, for example, to actuate an on-board buzzer in the combination instrument or, on the vehicle body, an LED "inflation lamp" (red=large distance from the setpoint pressure, yellow=close to the setpoint pressure and green=setpoint pressure reached) which is mounted on the mud guard.

Furthermore, it is, however, also conceivable that in this case the control device 14 and therefore the window lifters 14a are actuated by means of the TPM control device 12 to generate a movement. It is also conceivable to actuate a door closing module to generate a clicking noise or to actuate windshield wipers to briefly generate a significantly visible movement. In addition, the folding in of the rear-view mirrors and, of course, also the actuation of a vehicle horn are conceivable.

It is expedient to extend the time period in which the TPM control device 12 is in the run-on mode N as soon as the TPM control device 12 has entered the "inflation assistance" mode once. As a result, a vehicle driver is given sufficient time also to correct other tires with respect to the tire pressure p. The extension of the run-on mode N will be indicated in the figure by the time t2'.

The disclosed embodiments are used only for general explanation of the core concept of the disclosure. Within its scope of protection, the disclosure can instead also assume other exemplary embodiments or refinements than those previously described. In this context, it can in particular also have features which constitute a combination of individual features of the respective claims.

Illustrative embodiments relate to a method for monitoring an air pressure in at least one tire of a motor vehicle Such a method is known, for example, from DE 10 2008 003 845 A1. In this context, the data, such as pressure and temperature, which is measured by a tire measuring electronics unit is passed in a wireless fashion to a central control unit. After evaluation of the received measured data, the control unit transfers corresponding information or instructions to a suitable display device. A voice output or the use of sound signals is also proposed.

WO 2011/004229 A1 describes a tire pressure monitoring system in which travel direction indicators or a flashing warning light system and a vehicle horn are actuated by a control unit as a function of a measured tire pressure to generate optical and/or acoustic warning signals.

The measured data which is transferred in a wireless fashion from a measuring electronics unit located in the tires are transferred at a specific transmission frequency, wherein to set an optimum transmission frequency the transmission frequency is changed from a low transmission frequency to a high transmission frequency as a function of a limiting value of the vehicle speed and the change in pressure measured over time.

The methods and devices known from the prior art require a switched-on ignition of the motor vehicle.

However, this means that in the case of any possibly necessary correction of the tire inflation pressure at gas stations or the like a vehicle driver must leave the ignition key in the motor vehicle during his servicing work.

As a result of such a situation, the motor vehicle is exposed to an increased risk of theft while the vehicle driver is working. Furthermore, a switched-on ignition system means that switched-on loads, such as for example the ventilation system, radio, lighting system and the like, continue to draw current and load the battery.

LIST OF REFERENCE SYMBOLS

10 Tire
11 Measuring electronics unit
12 Control device for tire pressure monitoring (TPM control device)
13 Gateway
14 Control device for window lifters
14a Window lifter
15 Control device for travel direction indicator
16 Vehicle on-board power system control device
17 Travel direction indicator
18 Exterior rear-view mirror travel direction indicator
19 Control line
20 Control line
CAN1 CAN bus
CAN2 CAN bus
D Data packet
E Input signal
EB Ready-to-receive state (EB0=no ready-to-receive state; EB1=ready-to-receive state)
fBI0-5 Flashing frequencies fM0-2 Measuring frequencies of the tire measuring electronics unit
fS1-2 Transmission frequencies of the tire measuring electronics unit
G Limiting value for the change in pressure/time
ID-R Tire indentifier
ID-S Control device indentifier
K Motor vehicle
N Run-on mode
n Wheel speed
p Tire pressure
Δp Change in pressure
pmax Maximum permissible tire pressure
pmin Minimum necessary tire pressure
psoll Setpoint tire pressure
S1-2 Transmission modes
St Control signal
T Tire temperature
t Time, times
Z Ignition status (Z0=ignition off, Z1=ignition on)

The invention claimed is:

1. A method for monitoring an air pressure in at least one tire of a motor vehicle and alerting a user to the monitored air pressure, the method comprising:
measuring air pressure in the at least one tire by at least one measuring electronics unit present in the tire;
transmitting data by the at least one measuring electronics unit to a control unit at a first transmission frequency during a normal operation;
actuating, by the control unit, components of the motor vehicle as a function of the data to generate and output optical signals and/or acoustic signals indicating the monitored air pressure during the normal operation;
implementing, by the at least one measuring electronics unit, an operating mode change in response to detection of a limiting value of a pressure change in the tire in a specific time period being reached or exceeded;
wherein, in response to an ignition of the motor vehicle being shut off, the control unit is switched into a run-on mode only for a specific time period in which the control unit is configured to continue to receive data from the at least one measuring electronics unit and configured to actuate motor vehicle components as a function of the data to generate and output optical signals and/or acoustic signals indicating the monitored air pressure,
wherein implementing the operating mode change includes transmitting, by the at least one measuring electronics unit, data to the control unit at a second transmission frequency that is higher than the first transmission frequency.

2. The method of claim 1,
wherein the transmission of data at increased second transmission frequency causes the control unit to go into an assistance mode, which assists an active change in tire pressure, and for this purpose, to actuate, by a vehicle-specific bus system, motor vehicle components to generate optical signals and/or acoustic signals.

3. The method of claim 2, further comprising the control unit actuating at least one travel direction indicator during the assistance mode to indicate activation of the assistance mode, wherein the at least one travel direction indicator is firstly actuated to flash at a specific frequency, and, in response to the at least one measuring electronics unit detecting a change in tire pressure and transmitting corresponding data to the control unit, the control unit controls flashing frequency to change in one direction, starting from a specific frequency, as a setpoint pressure is increasingly approached,
wherein the control unit controls the flashing frequency to change in another direction as the distance from the setpoint pressure increases, and
wherein, in response to the setpoint pressure being reached, the control unit controls the at least one travel direction indicator to be actuated as a continuous light for a specific time period.

4. The method of claim 3, further comprising, the control unit actuating the at least one travel direction indicator to flash at a specific frequency which is higher than a highest frequency at which the at least one travel direction indicator has flashed before the setpoint pressure is reached in response to the at least one measuring electronics unit detecting that a permissible pressure range for the tire has been exceeded or undershot.

5. The method of claim 2, further comprising extending the run-on mode by a specific time period in response to the control unit going into the assistance mode once.

6. The method of claim 1, further comprising placing the at least one measuring electronics unit into a specific operating mode in which measuring frequency is increased compared to the normal operation in response to ignition of the motor vehicle being shut off for a specific time period.

7. The method of claim 3, further comprising, in response to the setpoint pressure being reached, the control unit controls an on-board buzzer, at least one electric window lifter, a door closing system, at least one windshield wiper, one rear-view minor adjustment system or a voice output system to be activated to indicate that the setpoint pressure has been reached.

8. A motor vehicle that monitors an air pressure in at least one tire and alerts a user to the monitored air pressure, the motor vehicle comprising:
a control unit; and
at least one measuring electronics unit, present in the at least one tire, for (i) measuring air pressure in the at least one tire, (ii) transmitting data of the at least one measuring electronics unit to the control unit at a first transmission frequency during a normal operation, and (iii) implementing an operating mode change in response to detection of a limiting value of a pressure change in the tire in a specific time period being reached or exceeded,
wherein the control unit controls components of the motor vehicle as a function of the data transmitted from the at least one measuring electronics unit to generate and output optical signals and/or acoustic signals indicating the monitored air pressure during the normal operation,
wherein, in response to an ignition of the motor vehicle being shut off, the control unit is switched into a run-on mode only for a specific time period in which the control unit is configured to continue to receive data from the measuring electronics unit and actuate components of the motor vehicle as a function of the data to generate and output optical signals and/or acoustic signals indicating the monitored air pressure, and
wherein, in response to an implementation of the operating mode change, the at least one measuring electronics unit is configured to transmit data to the control unit at a second transmission frequency that is higher than the first transmission frequency.

9. The motor vehicle of claim 8,
wherein the transmission of data at increased second transmission frequency causes the control unit to go into an assistance mode, which assists an active change in tire pressure, and for this purpose, to actuate, by a vehicle-specific bus system, motor vehicle components to generate optical signals and/or acoustic signals.

10. The motor vehicle of claim 9, wherein the control unit actuating at least one travel direction indicator during the assistance mode to indicate activation of the assistance mode, wherein the at least one travel direction indicator is firstly actuated to flash at a specific frequency, and, in response to the at least one measuring electronics unit detecting a change in tire pressure and transmitting corresponding data to the control unit, the control unit controls flashing frequency to change in one direction, starting from a specific frequency, as a setpoint pressure is increasingly approached, wherein the control unit controls the flashing frequency to change in another direction as the distance from the setpoint pressure increases, and wherein, in response to the setpoint pressure being reached, the control unit controls the at least one travel direction indicator to be actuated as a continuous light for a specific time period.

11. The motor vehicle of claim 10, wherein the control unit actuates the at least one travel direction indicator to flash at a specific frequency which is higher than a highest frequency at which the at least one travel direction indicator has flashed before the setpoint pressure is reached in response to the at least one measuring electronics unit detecting that a permissible pressure range for the tire has been exceeded or undershot.

12. The motor vehicle of claim 9, wherein the run-on mode is extended by a specific time period in response to the control unit going into the assistance mode once.

13. The motor vehicle of claim 9, wherein the at least one measuring electronics unit is placed into a specific operating mode in which measuring frequency is increased compared to the normal operation in response to ignition of the motor vehicle being shut off for a specific time period.

14. The motor vehicle of claim 10, wherein, in response to the setpoint pressure being reached, the control unit controls an on-board buzzer, at least one electric window lifter, a door closing system, at least one windshield wiper, one rear-view minor adjustment system or a voice output system to be activated to indicate that the setpoint pressure has been reached.

15. A control unit in a motor vehicle that controls operations for monitoring an air pressure in at least one tire and alerting a user to the monitored air pressure, wherein the control unit comprises a processor configured to:

receive data from at least one measuring electronics unit present in the at least one tire for measuring air pressure in the at least one tire at a first transmission frequency during a normal operation, control components of the motor vehicle as a function of the data transmitted from the at least one measuring electronics unit to generate and output optical signals and/or acoustic signals indicating the monitored air pressure during the normal operation, detect a limiting value of a pressure change in the tire in a specific time period being reached or exceeded to actuate the at least one measuring electronics unit to implement an operating mode change, in response to an ignition of the motor vehicle being shut off, switch into a run-on mode only for a specific time period to continue to receive data from the measuring electronics unit and actuate components of the motor vehicle as a function of the data to generate and output optical signals and/or acoustic signals indicating the monitored air pressure, and in response to an implementation of the operating mode change, receive data from the at least one measuring electronics unit at a second transmission frequency that is higher than the first transmission frequency.

16. The control unit of claim 15, wherein the transmission of data at increased second transmission frequency causes the control unit to go into an assistance mode, which assists an active change in tire pressure, and for this purpose, to actuate, by a vehicle-specific bus system, motor vehicle components to generate optical signals and/or acoustic signals.

17. The control unit of claim 16, wherein the control unit actuates at least one travel direction indicator during the assistance mode to indicate activation of the assistance mode, wherein the at least one travel direction indicator is firstly actuated to flash at a specific frequency, and, in response to the at least one measuring electronics unit detecting a change in tire pressure and transmitting corresponding data to the control unit, the control unit controls flashing frequency to change in one direction, starting from a specific frequency, as a setpoint pressure is increasingly approached, and the control unit controls the flashing frequency to change in another direction as the distance from the setpoint pressure increases, wherein, in response to the setpoint pressure being reached, the control unit controls the at least one travel direction indicator to be actuated as a continuous light for a specific time period.

18. The control unit of claim 17, wherein the control unit actuates the at least one travel direction indicator to flash at a specific frequency which is higher than a highest frequency at which the at least one travel direction indicator has flashed before the setpoint pressure is reached in response to the at least one measuring electronics unit detecting that a permissible pressure range for the tire has been exceeded or undershot.

19. The control unit of claim 16, wherein the run-on mode is extended by a specific time period in response to the control unit going into the assistance mode once.

20. The control unit of claim 16, wherein the at least one measuring electronics unit is placed into a specific operating mode in which measuring frequency is increased compared to the normal operation in response to ignition of the motor vehicle being shut off for a specific time period.

21. The control unit of claim 17, wherein, in response to the setpoint pressure being reached, the control unit controls an on-board buzzer, at least one electric window lifter, a door closing system, at least one windshield wiper, one rear-view minor adjustment system or a voice output system to be activated to indicate that the setpoint pressure has been reached.

* * * * *